United States Patent
Kramer

(10) Patent No.: US 10,807,480 B2
(45) Date of Patent: Oct. 20, 2020

(54) ENERGY STORAGE ARRANGEMENT INCLUDING BATTERY UNIT IN INTERMEDIATE SPACE BETWEEN FLUID TANKS

(71) Applicant: Ford Global Technologies, LLC, Dearborn, MI (US)

(72) Inventor: Ulrich Kramer, Bergisch Gladbach (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 4 days.

(21) Appl. No.: 16/262,068

(22) Filed: Jan. 30, 2019

(65) Prior Publication Data

US 2019/0241081 A1 Aug. 8, 2019

(30) Foreign Application Priority Data

Feb. 5, 2018 (DE) .................. 10 2018 201 666

(51) Int. Cl.
*B60K 6/42* (2007.10)
*B60L 50/60* (2019.01)
(Continued)

(52) U.S. Cl.
CPC .............. *B60L 50/66* (2019.02); *B60K 1/04* (2013.01); *B60K 15/03* (2013.01); *B60L 50/71* (2019.02); *B60R 16/04* (2013.01); *H01M 2/1083* (2013.01); *B60K 6/28* (2013.01); *B60K 2001/0405* (2013.01);
(Continued)

(58) Field of Classification Search
CPC .......... B60L 50/66; B60L 50/71; B60L 50/50; B60L 50/60; B60L 50/75; B60K 1/04; B60K 2001/0466; B60K 2001/0405; B60K 2001/0455; B60K 2001/0494; B60K 6/28; B60K 15/03; B60K 15/03006; B60K 2015/03118; B60K 2015/03309; B60K 2015/03315; B60K 2015/03453;
(Continued)

(56) References Cited

U.S. PATENT DOCUMENTS 6,257,360 B1 * 7/2001 Wozniak .............. B60K 15/013
180/69.5
6,648,085 B2 11/2003 Nagura et al.
(Continued)

FOREIGN PATENT DOCUMENTS

EP 1717083 A2 2/2006

OTHER PUBLICATIONS

Peter Fisher, et al. "Electronic Integration of Fuel Cell and Battery System in Novel Hybrid Vehicle," Journal of Power Sources 220 (2012) pp. 114-121.

Primary Examiner — James M Dolak
(74) Attorney, Agent, or Firm — David B. Kelley; Carlson, Gaskey & Olds, P.C.

(57) ABSTRACT

This disclosure relates to an energy storage arrangement for a vehicle. In particular, the energy storage arrangement includes a battery unit provided in an intermediate space between adjacent fluid tanks. Relative to the above-discussed prior art, this disclosure provides an improved energy storage arrangement which uses the otherwise unused intermediate space between two adjacent fluid tanks. Thus, this disclosure provides a space-saving, efficient, and cost-effective arrangement.

14 Claims, 2 Drawing Sheets

(51) Int. Cl.
*B60K 1/04* (2019.01)
*B60L 50/71* (2019.01)
*B60K 15/03* (2006.01)
*B60R 16/04* (2006.01)
*H01M 2/10* (2006.01)
*B60K 6/28* (2007.10)

(52) U.S. Cl.
CPC ............... *B60K 2001/0466* (2013.01); *B60K 2015/03118* (2013.01); *B60K 2015/03309* (2013.01); *B60K 2015/03315* (2013.01); *B60Y 2200/92* (2013.01); *H01M 2220/20* (2013.01)

(58) Field of Classification Search
CPC .. B60K 2015/0346; B60K 2015/03467; B60R 16/04; H01M 2/1083; H01M 2220/20
See application file for complete search history.

(56) References Cited

U.S. PATENT DOCUMENTS

| | | | |
|---|---|---|---|
| 7,556,110 B2 | 7/2009 | Yamamoto et al. | |
| 7,556,113 B2* | 7/2009 | Amori | B60K 1/04 180/68.5 |
| 7,614,473 B2* | 11/2009 | Ono | B60K 1/04 180/299 |
| 7,926,601 B2* | 4/2011 | Ono | B60K 15/063 180/68.5 |
| 8,227,103 B2* | 7/2012 | Tsukamoto | C09K 21/06 429/100 |
| 8,393,426 B2 | 3/2013 | Takahashi et al. | |
| 8,672,359 B2 | 3/2014 | Ohashi | |
| 8,965,608 B2* | 2/2015 | Yoshida | B60K 1/00 701/22 |
| 9,139,074 B2* | 9/2015 | Jarocki | B60L 50/64 |
| 9,620,830 B2* | 4/2017 | Chan | H01M 10/643 |
| 10,150,357 B2* | 12/2018 | Landgraf | B60L 53/54 |
| 10,632,830 B2* | 4/2020 | Sugizaki | B60K 6/28 |
| 2006/0061081 A1* | 3/2006 | Kresse, Jr. | B60K 15/07 280/834 |
| 2006/0102398 A1* | 5/2006 | Mizuno | B60K 1/02 429/430 |
| 2008/0283316 A1 | 11/2008 | Ono et al. | |
| 2011/0111662 A1 | 5/2011 | Choate et al. | |
| 2017/0120738 A1 | 5/2017 | Landgraf et al. | |

* cited by examiner

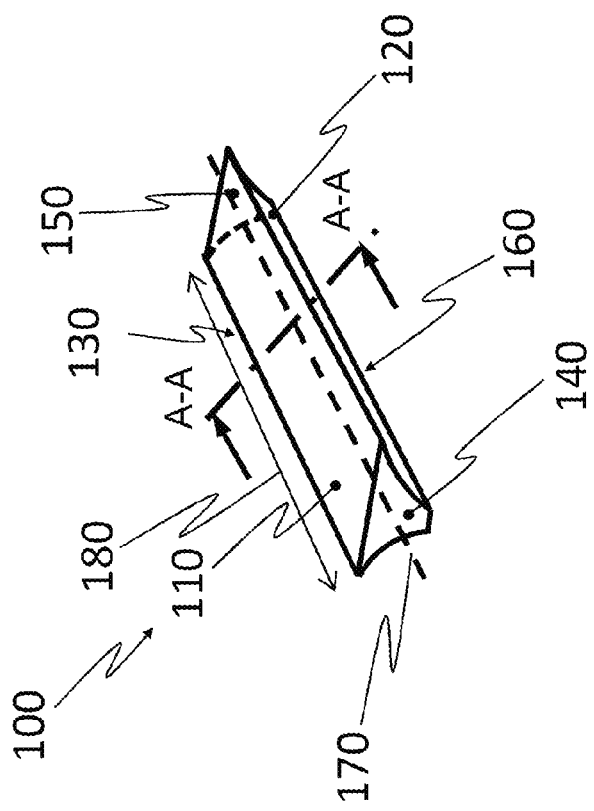
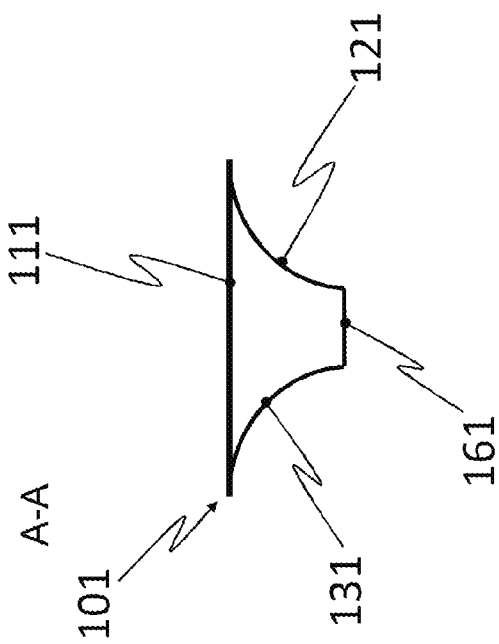
Figure 1a
Figure 1b

US 10,807,480 B2

ENERGY STORAGE ARRANGEMENT INCLUDING BATTERY UNIT IN INTERMEDIATE SPACE BETWEEN FLUID TANKS

RELATED APPLICATION(S)

This application claims priority to German Patent Application No. 102018201666.6, filed on Feb. 5, 2018, the entirety of which is herein incorporated by reference.

TECHNICAL FIELD

This disclosure relates to an energy storage arrangement for a vehicle. In particular, the energy storage arrangement includes a battery unit provided in an intermediate space between adjacent fluid tanks.

BACKGROUND

Gaseous fuels are becoming increasingly popular in the automotive field, in particular on account of their reduced $CO_2$ emissions relative to liquid fuels. Gaseous fuels may be used in motor vehicles that are driven exclusively by an internal combustion engine (ICE), natural gas vehicles (NGVs), or electrified vehicles such as hybrid electric vehicles (HEVs) and plug-in hybrid electric vehicles (PHEVs).

Vehicles equipped with a combination of hybrid technology and a gaseous fuel combustion engine are relatively efficient. However, such vehicles also require additional space for receiving the respective storage devices, namely fluid tanks (i.e., fuel tanks) and battery assemblies. The fluid tanks are typically cylindrical in shape. On the other hand, battery assemblies typically exhibit a cuboid or cylindrical shape. Several known fluid tank and battery assembly packaging arrangements will now be described.

For instance, in U.S. Publication No. 2011/00111662, a multi-function tank comprises a relatively small cylindrical tank arranged centrally in the tank. The small cylindrical tank may be used to store liquids and/or gases, and is surrounded by a plurality of rings of batteries.

U.S. Pat. No. 7,556,113 discloses a single storage tank for compressed gas which has a generally cylindrical outer wall and a battery assembly consisting of substantially flat outer walls. U.S. Publication No. 2017/0120738 discloses a single storage tank adjacent two chambers which receive battery cells Like in the '133 patent, the chambers exhibit substantially flat outer walls, and in particular are substantially square in cross-section, as shown in FIG. 6.

In both U.S. Pat. No. 8,672,359 and U.S. Publication no. 2006/0102398, the vehicles include multiple fuel tanks, but the intermediate space between adjacent fuel tanks is not occupied by a battery assembly. Rather, the battery assembly is mounted elsewhere in the vehicle.

In U.S. Pat. No. 7,556,110, a fuel cell vehicle has two battery assemblies arranged on the right-hand and left-hand sides of the vehicle. The battery assemblies are spaced-apart from a cylindrical fuel tank, as shown in FIGS. 2 and 5.

In U.S. Pat. No. 8,393,426 a battery assembly and a fuel tank appear to overlap one another, however they are mounted on opposite sides of a floor panel, as shown in FIG. 8A.

U.S. Pat. No. 6,648,085 discloses an arrangement in which a fuel tank and a battery assembly are arranged within a common case in a floor of a vehicle.

Finally, an article to Fisher et al. entitled "Electronic Integration of Fuel Cell and Battery System in Novel Hybrid Vehicle" discloses a vehicle including a battery assembly and a hydrogen fuel cell. In the Fisher article, the hydrogen fuel cell and tank are arranged within a "spare wheel" space.

SUMMARY

A vehicle according to an exemplary aspect of the present disclosure includes, among other things, at least two cylindrical fluid tanks and at least one battery unit configured to supply a drive unit of the vehicle with electrical energy. The at least one battery unit is arranged in an intermediate space between adjacent ones of the at least two cylindrical fluid tanks, and the at least one battery unit is shaped to correspond to a shape of the intermediate space.

In a further non-limiting embodiment of the foregoing vehicle, the battery unit includes an enclosure exhibiting a trapezoid-like shape in cross-section.

In a further non-limiting embodiment of any of the foregoing vehicles, the trapezoid-like shape is defined by at least two concave surfaces.

In a further non-limiting embodiment of any of the foregoing vehicles, a first of the concave surfaces directly contacts an outer surface of one of the at least two cylindrical fluid tanks, and a second of the concave surfaces directly contacts an outer surface of another of the at least two cylindrical fluid tanks.

In a further non-limiting embodiment of any of the foregoing vehicles, the trapezoid-like shape includes two substantially flat surfaces spaced-apart from one another and connected by the two concave surfaces.

In a further non-limiting embodiment of any of the foregoing vehicles, a first of the two substantially flat surfaces is wider than a second of the two substantially flat surfaces.

In a further non-limiting embodiment of any of the foregoing vehicles, the first of the two substantially flat surfaces lies in a plane including tangent lines to the at least two cylindrical fluid tanks.

In a further non-limiting embodiment of any of the foregoing vehicles, a spacing between adjacent ones of the at least two cylindrical tanks is less than 5 cm.

In a further non-limiting embodiment of any of the foregoing vehicles, the spacing is 0 cm, such that adjacent ones of the at least two cylindrical tanks are in direct contact with one another.

In a further non-limiting embodiment of any of the foregoing vehicles, the battery unit fills a majority of half of the intermediate space.

In a further non-limiting embodiment of any of the foregoing vehicles, the battery unit substantially completely fills half of the intermediate space.

In a further non-limiting embodiment of any of the foregoing vehicles, a plurality of intermediate spaces are defined between adjacent ones of the at least two fluid tanks, and the at least one battery unit includes a plurality of battery units, each arranged within a respective one of the intermediate spaces.

In a further non-limiting embodiment of any of the foregoing vehicles, the intermediate space between adjacent first and second cylindrical fluid tanks is delimited by outer walls of the first and second cylindrical fluid tanks, and by a first intermediate delimiting plane including tangent lines to the first and second cylindrical fluid tanks.

In a further non-limiting embodiment of any of the foregoing vehicles, the intermediate space is further delimited by a second intermediate delimiting plane spaced-apart from and parallel to the first intermediate delimiting plane, and wherein the second delimiting plane also includes tangent lines to the first and second cylindrical fluid tanks.

In a further non-limiting embodiment of any of the foregoing vehicles, the at least two fluid tanks store natural gas or hydrogen.

A battery unit according to an exemplary aspect of the present disclosure includes, among other things, an enclosure exhibiting a trapezoid-like shape in cross-section and configured to fit in an intermediate space between two adjacent cylindrical fluid tanks.

In a further non-limiting embodiment of the battery unit, the trapezoid-like shape is defined by at least two concave surfaces.

In a further non-limiting embodiment of any of the foregoing battery units, the trapezoid-like shape includes two substantially flat surfaces spaced-apart from one another and connected by the two concave surfaces.

In a further non-limiting embodiment of any of the foregoing battery units, a first of the two substantially flat surfaces is wider than a second of the two substantially flat surfaces.

In a further non-limiting embodiment of any of the foregoing battery units, the two substantially flat surfaces are parallel to one another.

BRIEF DESCRIPTION OF THE DRAWINGS

FIG. 1A schematically illustrates an exemplary embodiment of a battery unit from a perspective view.

FIG. 1B is a cross-sectional view of the battery unit from FIG. 1A.

DETAILED DESCRIPTION

Figure 2:
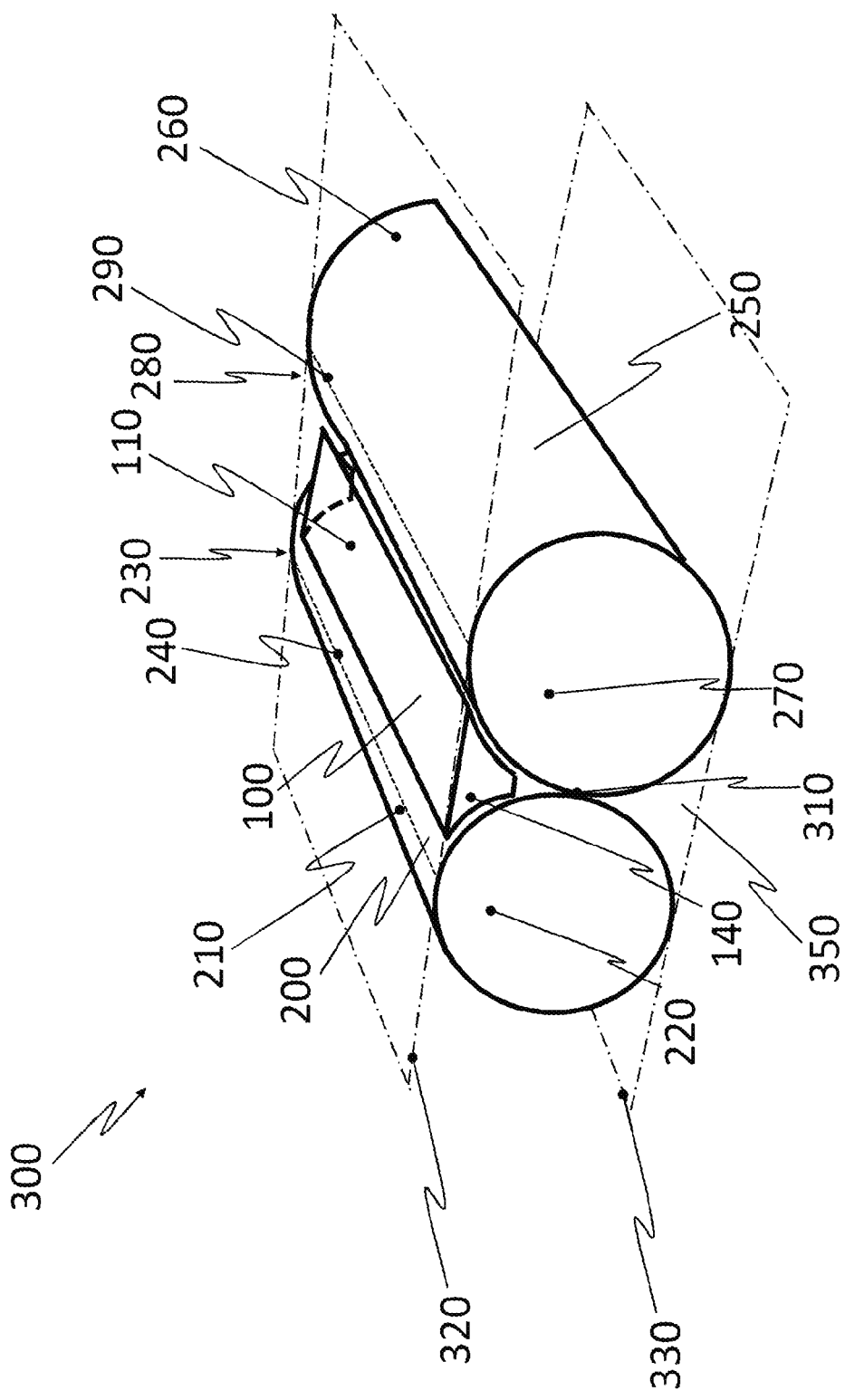
FIG. 2 schematically illustrates an exemplary energy storage arrangement from a perspective view. In particular, FIG. 2 schematically illustrates the battery unit of FIG. 1A arranged in an intermediate space between two adjacent fluid tanks.

This disclosure relates to an energy storage arrangement for a vehicle. In particular, the energy storage arrangement includes a battery unit provided in an intermediate space between adjacent fluid tanks. Relative to the above-discussed prior art, this disclosure provides an improved energy storage arrangement which uses the otherwise unused intermediate space between two adjacent fluid tanks. Thus, this disclosure provides a space-saving, efficient, and cost-effective arrangement.

In the below description, certain components that are disclosed individually may be combined with one another and thus demonstrate further embodiments of the invention. Further, while reference is made to a "fluid tank," this includes a reference to any fluid tank, such as fuel tanks storing gaseous or liquid fuel, and in particular including fuel tanks storing a gas mixture. Moreover, the term "battery unit" includes all energy storage devices for storing and providing electric current for driving an electrified vehicle. Such "battery units" are sometimes referred to as "battery assemblies," and include a plurality of interconnected battery cells arranged and held within an enclosure or housing.

In one example, this disclosure includes an energy storage arrangement for a vehicle, such as hybrid electric vehicle including both an internal combustion engine drive and a battery electric drive. The internal combustion engine may work with both petroleum and compressed gaseous fuels, such as natural gas.

The energy storage arrangement includes at least one battery unit for supplying power to a drive unit of the vehicle, and further includes at least two cylindrical fluid tanks. The fluid tanks are arranged adjacent one another and form an intermediate space therebetween. The intermediate space is the space between the fluid tanks which is unoccupied by the fluid tanks. In this sense, the intermediate space may be considered negative space. The at least one battery unit is shaped to correspond to the intermediate space, such that when the battery unit is arranged between the fluid tanks, it fits suitably in the intermediate space in a way that occupies a large portion of the intermediate space. This arrangement uses otherwise unused space between the two fluid tanks as a stowage space for batteries.

The fluid tanks may be filled with compressed gas and/or liquid gas, in particular natural gas and/or hydrogen, wherein these fluids are stored under a high pressure. Thus, cylindrically-shaped tanks are appropriate. The fluid tanks may be high pressure tanks, including Compressed Natural Gas Tanks (CNG tanks) or Compressed $H_2$ Tanks (CH2 tanks). The combination of cylindrical high pressure tanks and a battery unit being stored between the tanks represents an efficient energy storage arrangement, which saves space and/or weight, for an electrified vehicle, such as a gas-hybrid vehicle.

In one embodiment of this disclosure, a spacing between two or more of the fluid tanks amounts is less than 5 cm. In particular, the spacing between adjacent fluid tanks is less than 2 cm, or less than 1 cm. In another arrangement, the fluid tanks are in direct contact with one another, meaning the spacing is 0 cm. It is possible by virtue of the small spacing between the fluid tanks, or the lack of a spacing between said fluid tanks, to achieve the energy storage arrangement in a particularly space-saving manner. By virtue of the fact that a battery unit is usually assembled from many small battery cells, it is possible to select an outer shape of a battery unit for the arrangement of these battery cells according to the intermediate space that is available between two fluid tanks. In particular, the enclosure, or housing, of the battery unit may be shaped to correspond to the intermediate space available between the fluid tanks.

The gas pressure in a filled natural gas tank is usually in the region of 200 bar (about 2900 psi), and in a hydrogen pressure storage device the pressure is in the region of 700 bar (about 10,150 psi). For safety reasons, the tanks are designed to accommodate higher pressures. In order to be able to withstand such pressures, a cylindrically-shaped fluid tank is appropriate as it provides a pressure-stable geometry. Even in the case of a small spacing or non-existent spacing between two cylindrical fluid tanks, it is possible to arrange a battery unit which is shaped to correspond to the intermediate space between the fluid tanks. In particular, the enclosure of the battery unit exhibits outer contours that correspond to, and substantially match, the outer contours of the fluid tanks.

In a further aspect of this disclosure, the energy storage arrangement is characterized by a row of fluid tanks. Intermediate spaces are formed between adjacent fluid tanks, and a battery unit is arranged within each intermediate space and/or in such a manner as to fill the respective spaces. Known vehicles comprising a gas drive are equipped with three or more tanks. Generally, in each case, three to four tanks are latched together to form a tank module. The result is a row of cylinders that create much unused intermediate space between the individual cylinders. Providing battery units within these intermediate spaces produces a considerable space savings.

In one example, the intermediate space between adjacent fluid tanks is delimited by two fluid tank outer walls and by at least a first intermediate space delimiting plane. In the example, the first intermediate space delimiting plane adjoins both a first fluid tank outer wall and also at least a second fluid tank outer wall, and contacts the two fluid tanks in a flush manner. In particular, the first intermediate space delimiting plane includes tangent lines to both the first and second fluid tanks. As a consequence, the intermediate space has a trapezoidal-like shape in one example. The trapezoidal-like shape in a particular example is defined by two opposed, substantially flat lines, which are connected together by curved lines. The curved lines are concave lines, when viewed from a perspective outside the intermediate space. One of the substantially flat lines may lie in a plane including a tangent line to at least one of the fluid tanks. While it is generally difficult to use this intermediate space on account of this unusual, i.e. curved, shape, the intermediate space becomes available for the purpose of saving space by virtue of the particular design of the battery units.

In a further aspect of this disclosure, when there is spacing between the two fluid tanks, the intermediate space forms a double trapezoidal-like shape. The cross-section of the intermediate space resembles two of the trapezoidal-like shapes described above, stacked such that they taper in the middle, similar to the cross-section of an hourglass.

In another aspect of this disclosure, the battery unit includes a first curved battery wall, which directly contacts a first fluid tank outer wall. The battery unit further includes a second curved battery wall, which directly contacts contact a second fluid tank outer wall. The outer walls of the battery unit include concave outer walls that may lie in direct contact against a convex curved outer wall of a fluid tank, which has a circular cross-section. Again, the terms "convex" and "concave" are used relative to a perspective outside of the reference object. The arrangement, and in particular the relatively close spacing, between the battery units and fluid tanks may provide insulation with respect to temperature fluctuations. Further, it should be understood that the energy storage arrangement could include multiple intermediate spaces provided when there are additional fluid tanks, and thus the energy storage arrangement could fill those additional intermediate spaces with additional battery units or with differently-shaped (i.e., longer) battery units.

Another aspect of this disclosure pertains specifically to a battery unit. The battery unit supplies a drive unit of a vehicle, such as an electrified vehicle like a hybrid electric vehicle, with electrical energy. The battery unit is symmetrical along a central axis and exhibits a trapezoidal-like cross-section. The cross-section, in one example, includes four surfaces, two of which are curved surfaces. In a particular example, the cross-section includes four surfaces, two of which are opposed, substantially flat surfaces, which are connected together by opposed concave surfaces. One of the substantially flat surfaces may lie in a plane including a tangent line to an adjacent fluid tank. The concave surfaces may be in direct contact with convex surfaces of adjacent fluid tanks.

Now turning to FIGS. 1A, 1B and 2, like components in the figures are provided with the same reference numerals, and for this reason such parts are generally also only described once. Further, while reference is made to auxiliary lines and auxiliary planes, this disclosure is not limited to exclusively or significantly symmetrical embodiments or to embodiments that have fluid tanks of an identical size.

FIG. 1A illustrates an exemplary battery unit 100 having an outer contour with six surfaces, defined respectively by six walls, which together define an enclosure or housing surrounding and supporting a plurality of battery cells. The battery unit 100 is substantially symmetrical about a central axis 170, and exhibits a length 180, which may be within a range of between 50-200 cm (about 20 to 80 in). Four of the six walls (i.e., those shown in FIG. 1B) have the length 180. Additional details of the walls will now be described.

The battery unit 100 comprises a first battery wall 110, which may extend parallel to or lie within a plane (i.e., plane 320) including a tangent to the fluid tanks 200, 250 (FIG. 2). A second battery wall 160 is arranged opposite the first battery wall 110, and in particular is spaced-apart from the first battery wall 110 and extends parallel thereto. The second battery wall 160 has a lesser width than the first battery wall 110 in this example. The first and second battery walls 110, 160 are arranged centrally the central axis 170, meaning a vertical plane including the central axis 170 bisects both the first and second walls 110.

The first and second battery walls 110, 160 are connected to one another via two curved battery walls. In particular, a first curved battery wall 120 and a second curved battery wall 130 connect the first and second battery walls 110, 160. The first and second curved battery walls 120, 130 are concave when viewed from a perspective outside the battery unit 100. The shape of the first and second curved battery walls 120, 130 permits the first and second battery walls 120, 130 to directly contact the convex outer walls 210, 260 of adjacent fluid tanks 200, 250 (FIG. 2). Moreover, the two curved battery walls 120, 130 are configured in a congruent manner, as a result of which the battery cross-section 101 (FIG. 1B) is symmetrical about a plane, such as the above-discussed vertical plane including the central axis 170.

End walls complete the enclosure of the battery unit 100. In particular, first and second end walls 140, 150 are connected to ends of the walls 110, 160, 120, 130. The first and second end walls 140, 150 are parallel to one another and spaced-apart from one another by the distance of the battery total length 180. Consequently, an at least essentially constant or invariable battery cross-section 101 is produced over the battery total length 180.

FIG. 1B illustrates the battery cross-section 101 as a sectional view along a section line A-A (FIG. 1A). The area of this battery cross-section 101 is trapezoid-like, with two opposed, parallel surfaces connected by two curved surfaces. In particular, the curved surfaces are concave surfaces. While in FIG. 1B there are four surfaces defining the cross-sectional shape of the battery unit 100, the curved surfaces may converge together in one example such that there is no bottom-most (relative to FIG. 1B) surface. In this respect, the battery cross-section 101 may be defined by three or more surfaces.

In the example of FIG. 1B, the battery cross section 101 comprises a first battery cross-section delimiting surface 111, which is part of the first battery wall 110, a second battery cross-section delimiting surface 161, which is part of the second battery wall 160, parallel to and spaced-apart from the first battery cross-section delimiting surface 111. The second battery cross-section delimiting surface 161 has a lesser width than the first battery cross-section delimiting surface 111. A first concave battery cross-section delimiting surface 121, which is part of the first curved battery wall 120, and a second concave battery cross-section delimiting surface 131, which is part of the second curved battery wall 130, are arranged opposite one another with the result that a closed quadrilateral is formed with the four delimiting surfaces 111, 161, 121, 131. This battery cross-section 101 also corresponds to, and is capable of fitting within, the cross-section of an available intermediate space between two cylindrical fluid tanks 200, 250 (FIG. 2).

FIG. 2 illustrates an energy storage arrangement 300 comprising a first fluid tank 200 and a second fluid tank 250. The first and second fluid tanks 200, 250 are cylindrical and exhibit a substantially constant circular cross-section along their length, in this example.

The first fluid tank 200 includes a first fluid tank outer wall 210, a circular first fluid tank end wall 220, and a second circular fluid tank end wall 230. The second fluid tank 250 likewise has a second fluid tank outer wall 260, a circular first fluid tank end wall 270, and a second fluid tank end wall 280.

The two fluid tanks 200, 250 have the same circular cross-section and are arranged such that they extend substantially parallel to one another. Further, the two fluid tanks 200, 250 are arranged in a horizontal manner relative to a frame of a vehicle, as an example. Moreover, the two fluid tanks 200, 250 may be arranged with a spacing 310 with respect to one another. The spacing 310 in FIG. 2 is 0 cm. In other words, the two fluid tanks 200, 250 are in direct contact with one another. In other examples, the spacing 310 may be non-zero, and may be less than 5 cm.

It is possible as a result of the parallel arrangement of the fluid tanks 200, 250 to define a first intermediate space delimiting plane 320 that adjoins the first fluid tank 200 at a first fluid tank peripheral line 240 and contains a tangent line to the first fluid tank 200. The first intermediate space delimiting plane 320 also adjoins the second fluid tank 250 at a second fluid tank peripheral line 290 and contains a tangent line to the second fluid tank 250. The two peripheral lines 240, 290 are arranged parallel with one another. The fluid tanks 200, 250 may be filled with fuel, in particular compressed gaseous fuel, such as hydrogen or natural gas.

A second intermediate space delimiting plane 330, which is spaced-apart from the first intermediate space delimiting plane 310, may also be defined. In this example, the second intermediate space delimiting plane 330 adjoins the first fluid tank 200 at fluid tank peripheral line (not illustrated) and the second fluid tank 250 at a fluid tank peripheral line (not illustrated), and contains tangent lines to both the first and second fluid tanks 200, 250. If the first fluid tank 200 and the second fluid tank 250 have the same cross-section, the first intermediate space delimiting plane 320 and the second intermediate delimiting plane 330 are arranged parallel with one another. The first fluid tank outer wall 210, the second fluid tank outer wall 260, the first intermediate space delimiting plane 320, and the second intermediate space delimiting plane 330 delimit an intermediate space 350 that, as a result of the spacing 310 of 0 cm, is divided into two identically sized halves in FIG. 2. A battery unit 100, which has an enclosure exhibiting the trapezoid-like shape described above, is arranged within the delimitation of the first half of the intermediate space 350, as a result of which optimum use is made of the space that is provided by the intermediate space 350. In an example, the battery unit 100 fills a majority of the upper half ("upper," relative to FIG. 2) of the intermediate space 350. Another, similar battery unit 100 may be arranged in the bottom half of the intermediate space. In a further example, the upper half of the intermediate space 350 is substantially completely filled by the battery unit 100, and the lower half of the intermediate space 350 is substantially completely filled by another battery unit.

It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An assembly providing an energy storage arrangement for a vehicle, comprising:
    a first cylindrical fluid tank;
    a second cylindrical fluid tank adjacent the first cylindrical fluid tank; and
    a battery unit configured to supply a drive unit of the vehicle with electrical energy, the battery unit arranged in an intermediate space between the first and second cylindrical fluid tanks, wherein the battery unit is shaped to correspond to a shape of the intermediate space,
    wherein the battery unit includes an enclosure exhibiting a trapezoid-like shape in cross-section defined by a first substantially flat surface, a second substantially flat surface having a lesser width than the first substantially flat surface, a first concave surface connecting a first side of the first substantially flat surface to a first side of the second substantially flat surface, and a second concave surface connecting a second side of the first substantially flat surface to a second side of the second substantially flat surface,
    wherein a plane including a central axis of the battery unit bisects both the first substantially flat surface and the second substantially flat surface, and
    wherein the first and second concave surfaces are on opposite sides of the plane.

2. The assembly as recited in claim 1, wherein the first concave surface directly contacts an outer surface of the first cylindrical fluid tank, and the second concave surface directly contacts an outer surface of the second cylindrical fluid tank.

3. The assembly as recited in claim 1, wherein the first substantially flat surface lies in a plane including tangent lines to the first and second cylindrical fluid tanks.

4. The assembly as recited in claim 1, wherein a spacing between the first and second cylindrical fluid tanks is less than 5 cm.

5. The assembly as recited in claim 4, wherein the spacing is 0 cm, such that the first and second cylindrical fluid tanks are in direct contact with one another.

6. The assembly as recited in claim 1, wherein the battery unit fills a majority of half of the intermediate space.

7. The assembly as recited in claim 1, wherein the intermediate space is delimited by outer walls of the first and second cylindrical fluid tanks, and by a first intermediate delimiting plane including tangent lines to the first and second cylindrical fluid tanks.

8. The assembly as recited in claim 7, wherein the intermediate space is further delimited by a second intermediate delimiting plane spaced-apart from and parallel to the first intermediate delimiting plane, and wherein the second delimiting plane also includes tangent lines to the first and second cylindrical fluid tanks.

9. The assembly as recited in claim 1, wherein the first and second cylindrical fluid tanks store natural gas or hydrogen.

10. The assembly as recited in claim 1, wherein the central axis extends in a direction parallel to a length of the battery unit.

11. The assembly as recited in claim 10, wherein the cross-section is taken along a line perpendicular to the central axis.

12. The assembly as recited in claim 10, wherein the enclosure is symmetrical about the plane in cross-section.

13. The assembly as recited in claim 10, wherein the first substantially flat surface, the second substantially flat surface, the first concave surface, and the second concave surface each exhibit the length.

14. The assembly as recited in claim 1, wherein the first substantially flat surface is a flat surface lying in a first plane, and the second substantially flat surface is a flat surface lying in a second plane spaced-apart from and parallel to the first plane.

* * * * *